(12) United States Patent
Choi et al.

(10) Patent No.: US 11,994,483 B2
(45) Date of Patent: May 28, 2024

(54) APPARATUS FOR DETECTING RAIN USING WIRE MESH SENSOR

(71) Applicant: NATIONAL INSTITUTE OF METEOROLOGICAL SCIENCES, Seogwipo-si (KR)

(72) Inventors: Kyu Young Reno Choi, Seogwipo-si (KR); Ki Hoon Kim, Seogwipo-si (KR); So Ra In, Seogwipo-si (KR); Min Woo Kim, Seogwipo-si (KR); Byeong Taek Kim, Seogwipo-si (KR)

(73) Assignee: NATIONAL INSTITUTE OF METEOROLOGICAL SCIENCES, Seogwipo-si (KR)

(*) Notice: Subject to any disclaimer, the term of this patent is extended or adjusted under 35 U.S.C. 154(b) by 0 days.

(21) Appl. No.: 18/231,134

(22) Filed: Aug. 7, 2023

(65) Prior Publication Data

US 2024/0142397 A1 May 2, 2024

(30) Foreign Application Priority Data

Oct. 31, 2022 (KR) .......................... 10-2022-0142951

(51) Int. Cl.
*G01N 27/04* (2006.01)
*G01N 27/06* (2006.01)
(Continued)

(52) U.S. Cl.
CPC .......... *G01N 27/048* (2013.01); *G01N 27/06* (2013.01); *G01N 27/07* (2013.01); *G01N 27/223* (2013.01); *G01V 3/02* (2013.01); *G01W 1/14* (2013.01)

(58) Field of Classification Search
CPC ........ G01V 3/02; G01N 27/048; G01N 27/06; G01N 27/27; G01N 27/07; G01N 27/223;
(Continued)

(56) References Cited

U.S. PATENT DOCUMENTS 9,063,067 B1* 6/2015 Schmitt ................ G01N 27/225
9,624,672 B1* 4/2017 Gunness ................ G01N 27/20
(Continued)

FOREIGN PATENT DOCUMENTS

CN 101960299 A * 1/2011 .......... A01G 25/167
CN 207095921 U * 3/2018
(Continued)

OTHER PUBLICATIONS

Helmholtz-Zentrum Dresden-Rossendorf, Wire-Mesh Sensors. https://www.hzdr.de/db/Cms?pOid=25191&pNid=393&pLang=en. Aug. 2020 (Year: 2020).*
(Continued)

*Primary Examiner* — Amy He
(74) *Attorney, Agent, or Firm* — Maschoff Brennan

(57) ABSTRACT

In accordance with one aspect of the present disclosure, there is provided an apparatus for detecting rain using a wire mesh sensor including: a wire mesh which is configured to include a plurality of transmitters and a plurality of receivers; and a fixing part for fixing the wire mesh; wherein the plurality of transmitters supply electricity to the wire mesh, and wherein, in response to rain being positioned between a specific transmitter among the plurality of transmitters and a specific receiver among the plurality of receivers, the specific receiver is configured to receive the electricity from the specific transmitter and then transmit the electricity to a measuring part, to thereby allow the measuring part to measure conductivity. This hemispherical apparatus can detect rain accurately by making the incident angles of the rain to be vertical regardless of the directions of the rain.

5 Claims, 5 Drawing Sheets

(51) Int. Cl.
  *G01N 27/07* (2006.01)
  *G01N 27/22* (2006.01)
  *G01V 3/02* (2006.01)
  *G01W 1/14* (2006.01)

(58) Field of Classification Search
  CPC ......... G01N 7/121; G01W 1/14; G01D 21/02; G01R 27/22
  USPC .......................................... 324/691, 693, 694
  See application file for complete search history.

(56) References Cited

U.S. PATENT DOCUMENTS

| | | | | |
|---|---|---|---|---|
| 9,632,003 | B1 * | 4/2017 | Gunness | ................. E04D 13/14 |
| 10,768,340 | B2 * | 9/2020 | Koch | ....................... G01W 1/14 |
| 11,555,945 | B2 * | 1/2023 | Koch | ....................... G01W 1/02 |
| 2017/0096818 | A1 * | 4/2017 | Gunness | ................. E04D 13/14 |
| 2017/0097276 | A1 * | 4/2017 | Gunness | ................. G01N 27/20 |
| 2017/0224280 | A1 * | 8/2017 | Bozkurt | ................. G01L 5/0014 |
| 2018/0024271 | A1 * | 1/2018 | Koch | ....................... G01W 1/02 |
| | | | | 702/3 |
| 2019/0344520 | A1 | 11/2019 | Sadeghi | |
| 2021/0003743 | A1 * | 1/2021 | Koch | ....................... G01W 1/14 |
| 2023/0311028 | A1 * | 10/2023 | Goh | ....................... B01D 35/06 |
| | | | | 210/97 |

FOREIGN PATENT DOCUMENTS

| | | | | | |
|---|---|---|---|---|---|
| CN | 110389016 | A | * | 10/2019 | ............ G01M 10/00 |
| CN | 107422399 | B | * | 11/2019 | .............. G01W 1/14 |
| CN | 110763704 | A | * | 2/2020 | |
| JP | S62-188955 | A | | 8/1987 | |
| JP | H0720118 | A | * | 1/1995 | |
| JP | 2021502565 | A | * | 1/2021 | |
| KR | 10-1543967 | B1 | | 8/2015 | |
| KR | 101543967 | B1 | * | 8/2015 | |
| KR | 101543968 | B1 | * | 8/2015 | ................ G01P 5/12 |
| KR | 10-1623945 | B1 | | 5/2016 | |
| KR | 10-2017-0052864 | A | | 5/2017 | |
| KR | 20170052864 | A | * | 5/2017 | |
| KR | 20180014581 | A | * | 2/2018 | |
| KR | 102057989 | B1 | * | 12/2019 | |
| KR | 102525922 | B1 | * | 4/2023 | |

OTHER PUBLICATIONS

Helmholtz-Zentrum Dresden-Rossendorf, Conductivity Wire-Mesh Sensors.https://www.hzdr.de/db/Cms?pOid=10412&pNid=626. No Way Back Date Available. Public dated considered to be Aug. 22, 2023 per website. (Year: 2023).*

Velasco et al., Applications of wire-mesh sensors in multiphase flows. Flow Measurement and Instrumentation 45 (2015) 255-273. http://dx.doi.org/10.1016/j.flowmeasinst.2015.06.024. Copyright 2015 Elsevier Ltd. (Year: 2015).*

W. Liu, C. Tan and F. Dong, "A wire-mesh sensor for air-water two-phase flow imaging," 2015 IEEE International Instrumentation and Measurement Technology Conference (I2MTC) Proceedings, Pisa, Italy, 2015, pp. 364-369, (Year: 2015).*

KR Office Action dated Dec. 15, 2022 as received in Application No. 10-2022-0142951.

KR Decision to Grant Dated Apr. 5, 2023 as received in Application No. 10-2022-0142951.

* cited by examiner

APPARATUS FOR DETECTING RAIN USING WIRE MESH SENSOR

FIELD OF THE DISCLOSURE

The present invention relates to an apparatus for detecting rain using a wire mesh sensor.

BACKGROUND OF THE DISCLOSURE

An apparatus for detecting rain refers to an apparatus for detecting a presence or an absence of rain, which is distinct from rain gauge which measures an amount of rain.

For a conventional apparatus for detecting rain, there is an apparatus for detecting rain with measurement of impedance. For example, the apparatus for detecting rain with measurement of impedance is shown in FIG. 4A, where repetitive patterns are formed such that dielectric substances are positioned to be close to each other on an electronic substrate. The apparatus for detecting rain with measurement of impedance may determine the rain based on a degree of resistance being lowered when water droplet reaches between one of the dielectric substances and its adjacent one of the dielectric substances.

As another conventional apparatus for detecting rain, there is an optical disdrometer as shown in FIG. 4B. In detail, the optical disdrometer may measure characteristics of precipitation (for example, sizes of rain drops and hourly precipitation inferred therefrom) by measuring rain or snowfall passing through a measurement area by using at least one pair among a plurality of pairs comprised of a flat laser beam and an optical sensor located in the opposing sides. Specifically, referring to FIG. 4B, the optical disdrometer is characterized in that Camera A measures the light of Illumination unit A, Camera B measures the light of Illumination unit B, and sizes of the rain drops or the snowfall are calculated by using the measured values of Camera A and the measured values of Camera B in the Measurement area. Herein, the Measurement area is a portion overlapped by the Illumination unit A and Illumination unit B.

However, according to the apparatus for detecting rain with measurement of impedance, there is a disadvantage that measurement errors may occur due to a case in which rain falls in the opposite side of a detecting part of the apparatus for detecting rain with measurement of impedance.

In addition, according to the apparatus for detecting rain with measurement of impedance, there are various difficulties in detecting very little amount of the rain due to a relative large interval between one of the patterns and its adjacent one of the patterns, and there are cases of misrecognizing the rain although the rain is stopped because water droplets may be remained on some areas near the patterns due to dust, etc.

Meanwhile, according to the optical disdrometer, there is a disadvantage that measurement errors may occur due to a case in which directions of the rain fall on side surfaces of the optical disdrometer.

In addition, according to the optical disdrometer, there is a difficulty in that an additional design is necessary to minimize errors due to the case in which the directions of the rain fall on the side surfaces of the optical disdrometer.

Accordingly, an advanced apparatus for detecting rain in order to solve these problems is necessary.

SUMMARY OF THE DISCLOSURE

It is an object of the present disclosure to solve all the aforementioned problems.

It is another object of the present disclosure to provide an apparatus for detecting rain capable of accurately detecting rain by making incident angles of the rain to be vertical regardless of directions of the rain.

It is still another object of the present disclosure to recognize sizes and positions of precipitation passing through a measurement area of a wire mesh sensor.

It is still yet another object of the present disclosure to provide an apparatus for detecting rain capable of accurately detecting the rain by installing heating mesh parts with a similar topology to the wire mesh in order to remove rain droplet that may be present at one or more intersections on the wire mesh.

In accordance with one aspect of the present disclosure, there is provided an apparatus for detecting rain using a wire mesh sensor, including: a wire mesh which is configured to include a plurality of transmitters and a plurality of receivers; and a fixing part for fixing the wire mesh; wherein the plurality of transmitters supply electricity to the wire mesh, and wherein, in response to rain being positioned between a specific transmitter among the plurality of transmitters and a specific receiver among the plurality of receivers, the specific receiver is configured to receive the electricity from the specific transmitter and then transmit the electricity to a measuring part, to thereby allow the measuring part to measure conductivity, wherein the wire mesh includes: a first mesh part comprised of the plurality of transmitters and the plurality of receivers; and a second mesh part comprised of a plurality of heaters, wherein the first mesh part is characterized in that each of the plurality of transmitters is arranged in a 1-st direction identical to each other or in any direction within a 1-st threshold angle from the 1-st direction and that each of the plurality of receivers is arranged in a 2-nd direction identical to each other or in any direction within a 2-nd threshold angle from the 2-nd direction, and wherein each of the plurality of transmitters and each of the plurality of receivers are arranged at a right angle to each other or at any angle within a 3-rd threshold angle from the right angle, wherein the second mesh A part includes: 1-st second mesh parts arranged in the 1-st direction or in any direction within the 1-st threshold angle from the 1-st direction; and 2-nd second mesh parts arranged in the 2-nd direction or in any direction within the 2-nd threshold angle from the 2-nd direction, wherein the 1-st second mesh parts and the 2-nd second mesh parts are arranged at a right angle to each other or at any angle within the 3-rd threshold angle from the right angle, and wherein the wire mesh is characterized in that a 1-st circumferential wire having a longest length among the heaters in the 1-st second mesh parts and the plurality of transmitters is arranged in a 1-st circumferential direction, and other wires among the heaters in the 1-st second mesh parts and the plurality of transmitters are arranged in any direction within a 1-st circumferential threshold angle from the 1-st circumferential direction, and in that a 2-nd circumferential wire having a longest length among the heaters in the 2-nd second mesh parts and the plurality of receivers is arranged in a 2-nd circumferential direction, and other wires among the heaters in the 2-nd second mesh parts and the plurality of receivers are arranged in any direction within a 2-nd circumferential threshold angle from the 2-nd circumferential direction.

As one example, the wire mesh is characterized in that the plurality of transmitters and the heaters in the 1-st second mesh parts parallel thereto or arranged within the 1-st threshold angle are arranged alternately, and in that the plurality of receivers and the heaters in the 2-nd second mesh parts parallel thereto or arranged within the 2-nd threshold angle are arranged alternately.

In accordance with another aspect of the present disclosure, there is provided an apparatus for detecting rain using a wire mesh sensor, including: a wire mesh which is configured to include a plurality of transmitters and a plurality of receivers; and a fixing part for fixing the wire mesh; wherein the plurality of transmitters supply electricity to the wire mesh, and wherein, in response to rain being positioned between a specific transmitter among the plurality of transmitters and a specific receiver among the plurality of receivers, the specific receiver is configured to receive the electricity from the specific transmitter and then transmit the electricity to a measuring part, to thereby allow the measuring part to measure conductivity, wherein the wire mesh includes: a first mesh part comprised of the plurality of transmitters and the plurality of receivers; and a second mesh part comprised of a plurality of heaters, wherein the first mesh part is characterized in that each of the plurality of transmitters is arranged in a 1-st direction identical to each other or in any direction within a 1-st threshold angle from the 1-st direction and that each of the plurality of receivers is arranged in a 2-nd direction identical to each other or in any direction within a 2-nd threshold angle from the 2-nd direction, and wherein each of the plurality of transmitters and each of the plurality of receivers are arranged at a right angle to each other or at any angle within a 3-rd threshold angle from the right angle, wherein the second mesh part includes: 1-st second mesh parts arranged in the 1-st direction or in any direction within the 1-st threshold angle from the 1-st direction; and 2-nd second mesh parts arranged in the 2-nd direction or in any direction within the 2-nd threshold angle from the 2-nd direction, wherein the 1-st second mesh parts and the 2-nd second mesh parts are arranged at a right angle to each other or at any angle within the 3-rd threshold angle from the right angle, and wherein the wire mesh is characterized in that an insulating layer is formed at each of 1-st intersections where each of the transmitters and each of the receivers cross, wherein no insulating layer is formed between each of the 2-nd first mesh parts and each of the 2-nd second mesh parts at each of 2-nd intersections where each of the 1-st second mesh parts and each of the 2-nd second mesh parts cross, and wherein no insulating layer is formed at each of 3-rd intersections where each of the plurality of transmitters and each of the 2-nd second mesh parts cross or where each of the plurality of receivers and each of the 1-st second mesh parts cross.

As one example, each of the 1-st second mesh parts and each of the 2-nd second mesh parts are processed with insulation coating.

As one example, each of the plurality of transmitters is separated by a predetermined distance, wherein the predetermined distance is determined by referring to a size of the rain, and wherein each of the plurality of receivers is separated by a preset distance by referring to the size of the rain.

BRIEF DESCRIPTION OF THE DRAWINGS

The accompanying drawings used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
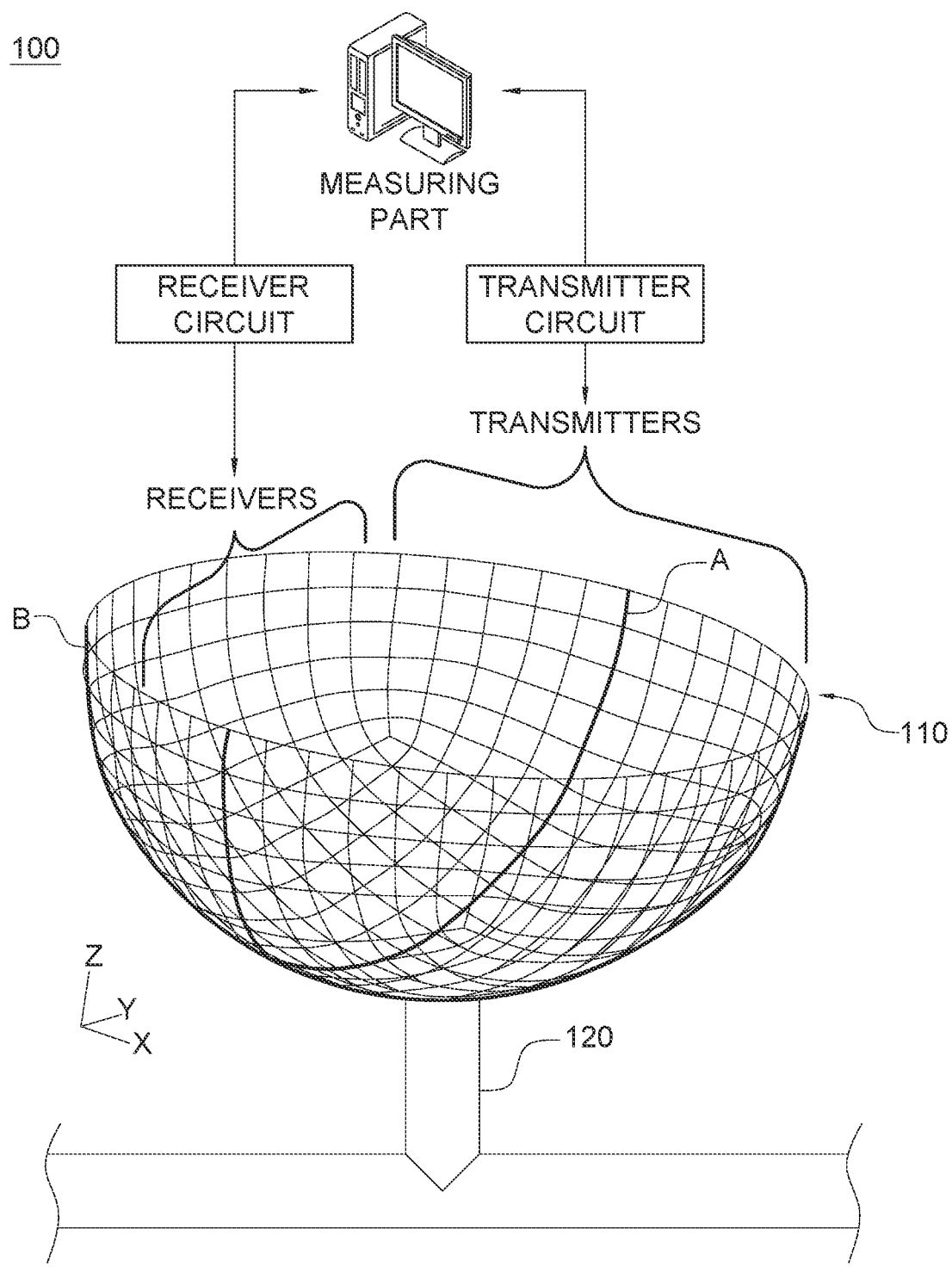
FIG. 1 is a drawing schematically illustrating an appearance of an apparatus for detecting rain using a wire mesh sensor in accordance with one example embodiment of the present disclosure.

The following detailed description of the present disclosure refers to the accompanying drawings, which show by way of illustration a specific embodiment in which the present disclosure may be practiced, in order to clarify the objects, technical solutions and advantages of the present disclosure. These embodiments are described in sufficient detail to enable those skilled in the art to practice the present disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Furthermore, the present invention includes all possible combinations of embodiments indicated in the present disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to carry out the present disclosure easily, the example embodiments of the present disclosure will be explained by referring to attached diagrams in detail as shown below.

FIG. 1 is a drawing schematically illustrating an appearance of an apparatus 100 for detecting rain using a wire mesh sensor in accordance with one example embodiment of the present disclosure.

By referring to FIG. 1, the apparatus 100 for detecting rain using a wire mesh sensor includes a wire mesh 110 which is configured to include a plurality of transmitters and a plurality of receivers; and a fixing part 120 for fixing the wire mesh 110. In FIG. 1, the fixing part 120 is shown in a form such as a pillar installed in a lower portion of the wire mesh 110, but the form of the fixing part 120 and the position of installation thereof is not limited thereto, and for example, the fixed part 120 may be configured as a separate wire in a manner that the wire mesh 110 is hung with the separate wire, etc. connected to a upper portion of another structure. One of the transmitters is marked with A and one of the receivers is marked with B. More specific explanation thereon will be provided with reference to FIG. 2.

The plurality of transmitters may supply electricity to the wire mesh 110 by being connected to an external power supply (not shown), and in response to rain being positioned between a specific transmitter among the plurality of transmitters and a specific receiver among the plurality of receivers, the specific receiver may be configured to receive the electricity from the specific transmitter and then transmit the electricity to a measuring part, to thereby allow the measuring part to measure conductivity. The process of the receiver being supplied with the electricity from the transmitter through the rain shall be specifically explained later by referring to FIG. 3.

Figure 2:
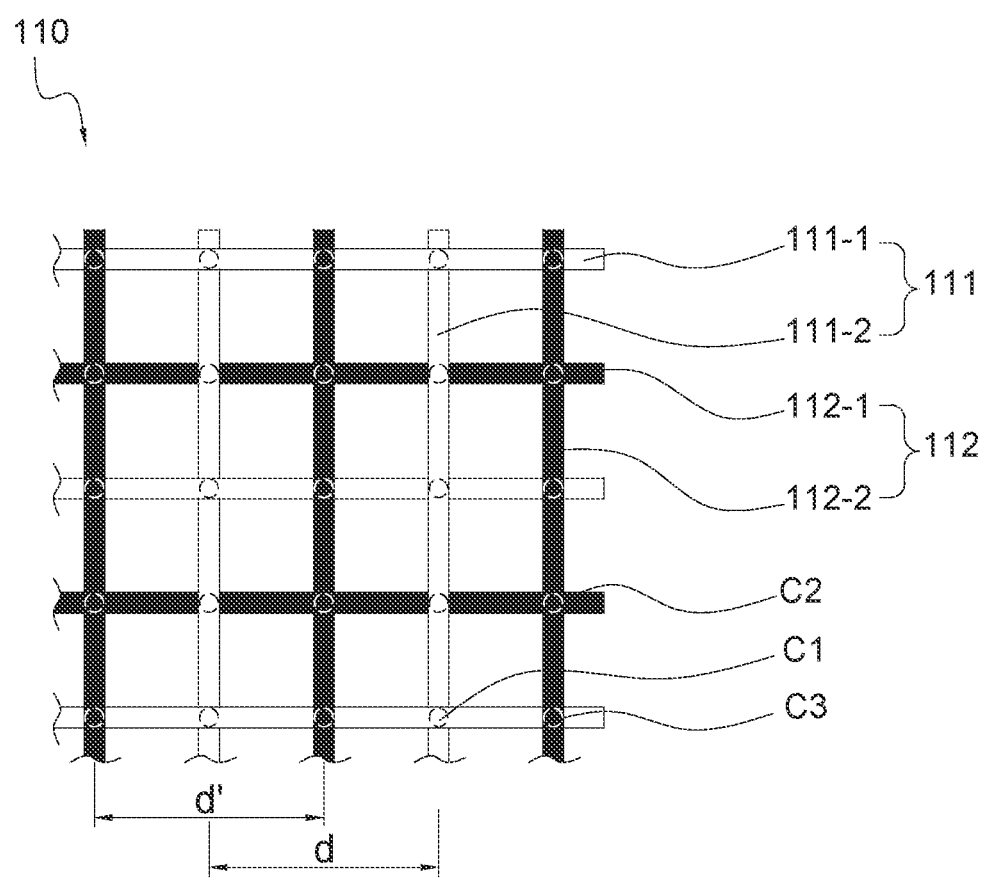
FIG. 2 is a drawing specifically illustrating a mesh structure of the apparatus for detecting rain using the wire mesh sensor in accordance with one example embodiment of the present disclosure.

FIG. 2 is a drawing specifically illustrating a mesh structure of the apparatus for detecting rain using the wire mesh sensor in accordance with one example embodiment of the present disclosure.

By referring to FIG. 2, the apparatus 100 for detecting rain using a wire mesh sensor may include a first mesh part 111 comprised of the plurality of transmitters 111-1 and the plurality of receivers 111-2; and a second mesh part 112 comprised of 1-st second mesh parts 112-1 and 2-nd second mesh parts 112-2, which are respectively a plurality of wire heaters.

Meanwhile, for the convenience of explanation, hereinafter, each point where each of the transmitters 111-1 and each of the receivers 111-2 cross shall be referred to as each 1-st A intersection C1, each point where each of the 1-st second mesh parts 112-1 and each of the 2-nd second mesh parts 112-2 cross shall be referred to as each 2-nd intersection C2, and each point where each of the plurality of transmitters and each of the 2-nd second mesh parts cross shall be referred to as each 3-rd intersection C3.

Specifically, each of the plurality of transmitters 111-1 is connected to the external power supply (not shown) and supplies the electricity to the specific receiver 111-2. In FIG. 2, each of the plurality of transmitters 111-1 is shown to be arranged in a 1-st direction identical to each other, but each may also be arranged in any direction within a 1-st threshold angle from the 1-st direction. That is, each of the plurality of transmitters 111-1 may be arranged in parallel to the 1-st direction, and even if it is not perfectly in parallel, it may be arranged to be deemed to be in parallel within a fixed angle.

Next, in response to the rain being positioned between any one of the plurality of transmitters 111-1 and any one of the plurality of receivers 111-2, said one of the plurality of receivers 111-2 may receive the electricity from said one of the transmitters 111-1 and then transmit the electricity to the measuring part. In FIG. 2, each of the plurality of receivers 111-2 is shown to be arranged in a 2-nd direction identical to each other, but each may also be arranged in any direction within a 2-nd threshold angle from the 2-nd direction. That is, each of the plurality of receivers 111-2 may be arranged in parallel to the 2-nd direction, and even if it is not perfectly in parallel, it may be arranged to be deemed to be in parallel within a fixed angle.

In addition, in FIG. 2, each of the plurality of transmitters 111-1 and each of the plurality of receivers are shown to be arranged at a right angle to each other, but they may also be at any angle within a 3-rd threshold angle from the right angle. That is, each of transmitters 111-1 and each of receivers 111-2 may be arranged perfectly at a right angle, or arranged to be deemed to be at a right angle within a fixed angle.

Next, the 1-st second mesh parts 112-1 are configured with wire heaters processed with insulation coating. In FIG. 2, the 1-st second mesh parts 112-1 is shown to be arranged in the 1-st direction identical to each of the plurality of transmitters 111-1, but it may also be arranged in any direction within the 1-st threshold angle from the 1-st direction. That is, each of the 1-st second mesh parts 112-1 may be arranged in parallel to the 1-st direction, and even if it is not perfectly in parallel, it may be arranged to be deemed to be in parallel within a fixed angle.

Likewise, the 2-nd second mesh parts 112-2 are configured with wire heaters processed with insulation coating. In FIG. 2, the 2-nd second mesh parts 112-2 is shown to be arranged in the 2-nd direction identical to each of the plurality of receivers 111-2, but it may also be arranged in any direction within the 2-nd threshold angle from the 2-nd direction. That is, each of the 2-nd second mesh parts 112-2 may be arranged in parallel to the 2-nd direction, and even if it is not perfectly in parallel, it may be arranged to be deemed to be in parallel within a fixed angle.

In FIG. 2, each of the 2-nd first mesh parts 112-1 and each of the 2-nd second mesh parts 112-2 are shown to be arranged at a right angle to each other, but they may be arranged in a direction within the 3-rd threshold angle from the right angle. That is, each of the 1-st second mesh parts 112-1 and each of 2-nd second mesh parts 112-2 may be arranged perfectly at the right angle, or arranged to be deemed to be at the right angle within a fixed angle.

In addition, each insulating layer is formed at each of the 1-st intersections C1 where each of the transmitters 111-1 and each of the receivers 111-2 cross, and it will be specifically explained later in FIG. 3 as to the structure of the insulating layer. However, because the 2-nd mesh part 112 is processed with the insulation coating, no insulating layer is formed at each of the 2-nd intersections C2 where each of the 1-st second mesh parts 112-1 and each of the 2-nd second mesh parts 112-2 cross. In addition, no insulating layer is formed at each of the 3-rd intersections C3 where each of the plurality of transmitters 111-1 and each of the 2-nd second mesh parts 112-2 cross or where each of the plurality of receivers 111-2 and each of the 2-nd first mesh parts 112-1 cross. Herein, each of the 1-st second mesh parts 112-1 and each of the 2-nd second mesh parts 112-2 do not need to be combined with each other at each of the 2-nd intersections C2, but a state of being combined with a predetermined adhesive, etc. is not excluded. Likewise, each of the plurality of receivers 111-2 and each of the 1-st second mesh parts 112-1 do not need to be combined with each other at each of the 3-rd intersections C3, but a state of being combined with a predetermined adhesive, etc. is not excluded.

Next, the plurality of transmitters 111-1 and the heaters in the 2-nd first mesh parts 112-1 are arranged alternately, and the plurality of receivers 111-2 and the heaters in the 2-nd second mesh parts 112-2 are also arranged alternately. That is, wires of the transmitters 111-1 and heating wires are arranged alternately, and wires of the receivers 111-2 and heating wires are arranged alternately. However, it is not limited thereto, and it does not need to be alternated as 1:1.

Herein, the heating wires 112 may apply heat periodically or under a predetermined condition (for example, a condition that an amount of rain present in the mesh parts exceeds the preset threshold or a control condition by an external remote control), to allow the rain to evaporate after performing the rain detection using the rain present in the wire mesh 110, to thereby support subsequent accurate detection of the rain again that may fall again later.

Meanwhile, other than the heating wire, the apparatus 100 may further comprise a vibration part (not shown) which can mechanically shake off the rain by applying vibration to the entire frame of the apparatus 100 periodically or under a predetermined condition (for example, the condition that the amount of rain present in the mesh parts exceeds the preset threshold or the control condition by the external remote control). The vibration part may be installed to be in contact with any region of the apparatus 100 for detecting rain in a form of a hemisphere, and in another case a vibration part may be installed inside or outside the fixing part 120 of the apparatus 100. The vibration part might be able to be implemented by ultrasound.

Next, each of the plurality of transmitters 111-1 and each of the plurality of receivers 111-2 are separated by a distance d by referring to the sizes or an average size of the rain, and each of the 1-st second mesh parts 112-1 and each of the 2-nd second mesh parts 122-2 are separated by a distance d' by referring to the distance d for uniform heating of the entire wire mesh. The distance d and d' may be set to be about 1 mm for detection of the smallest rain respectively, but they are not limited thereto.

By referring to FIG. 1 and FIG. 2 again, the wire mesh 110 is characterized in that a 1-st circumferential wire A having a longest length among the heaters in the 1-st second mesh parts 112-1 and the plurality of transmitters 111-1 is arranged in a 1-st circumferential direction, and other wires among the heaters in the 1-st second mesh parts 112-1 and the plurality of transmitters 111-1 are arranged in any direction within a 1-st circumferential threshold angle from the 1-st circumferential direction. Herein, said any direction within the 1-st circumferential threshold angle means a direction with a difference of a fixed angle from the 1-st circumferential direction. That is, this may mean that it is wholly parallel to the 1-st circumferential direction, and even if it is not perfectly in parallel, it may mean that it is arranged to be deemed to be in parallel within a fixed angle range.

Likewise, the wire mesh 110 is characterized in that a 2-nd circumferential wire B having a longest length among the heaters in the 2-nd second mesh parts 112-2 and the plurality of receivers 111-2 is arranged in a 2-nd circumferential direction, and other wires among the heaters in the 2-nd second mesh parts 112-2 and the plurality of receivers 111-2 are arranged in any direction within a 2-nd circumferential threshold angle from the 2-nd circumferential direction. Herein, said any direction within the 2-nd circumferential threshold angle means a direction with a difference of a fixed angle from the 2-nd circumferential direction. That is, this may mean that it is wholly parallel to the 2-nd circumferential direction, and even if it is not perfectly in parallel, it may mean that it is arranged to be deemed to be in parallel within a fixed angle range.

Accordingly, the wire mesh 110 of the apparatus 100 may show a form of the hemisphere as shown in FIG. 1, but the form of the wire mesh 110 is not limited thereto. However, if the wire mesh 110 is configured as a form of the hemisphere, regardless of the direction of the rain, the rain can be vertically directed to the wire mesh sensor, and thus there would be an advantage in that the effect due to the variation of the incident angle of the rain can be minimized.

Figure 3:
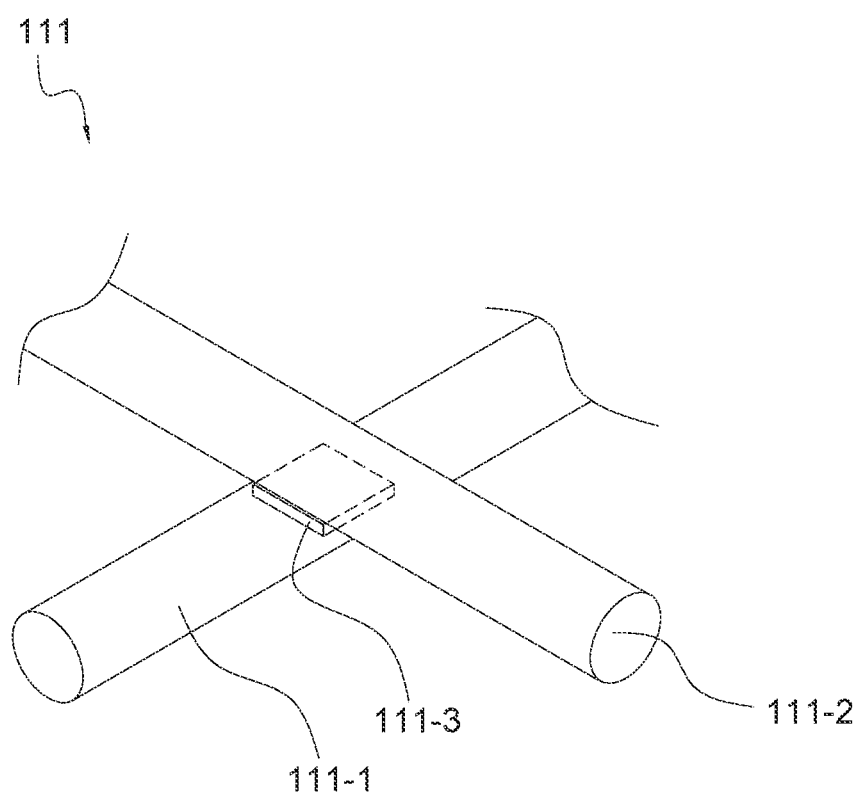
FIG. 3 is a drawing schematically illustrating an intersection of the mesh structure of the apparatus for detecting rain using the wire mesh sensor in accordance with one example embodiment of the present disclosure.
Figure 4A:
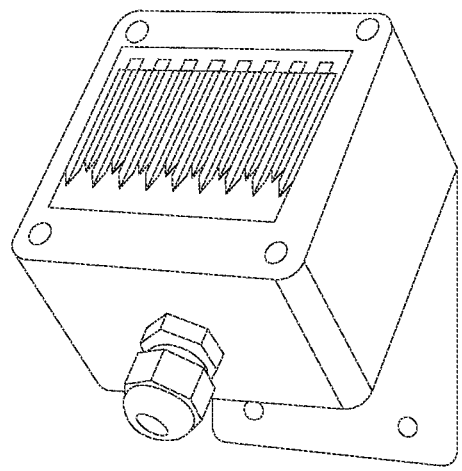
FIG. 4A and FIG. 4B are drawings respectively illustrating the conventional apparatus for detecting rain with measurement of impedance and the conventional optical disdrometer.
Figure 4B:
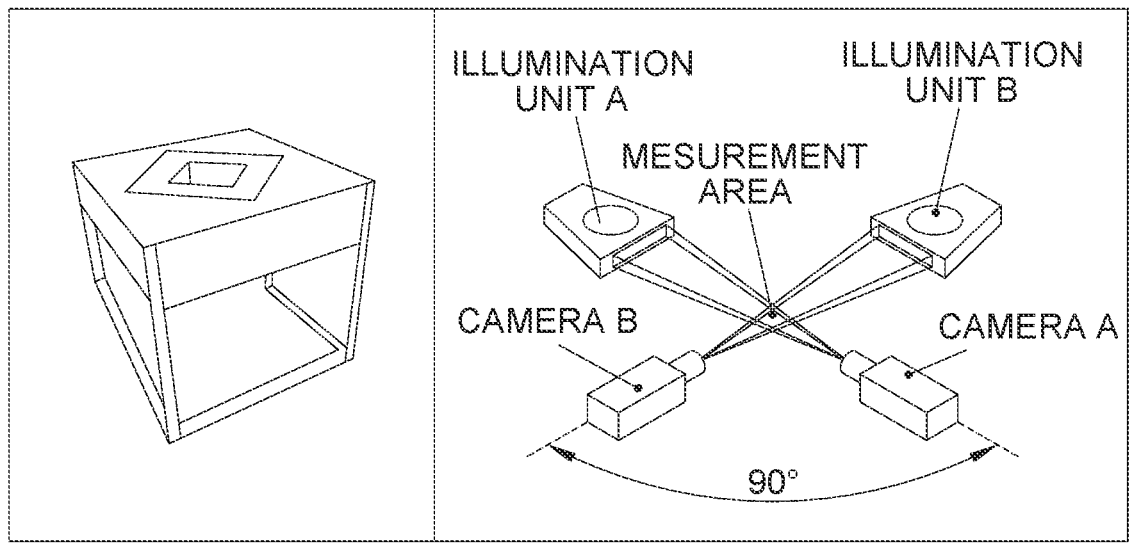

FIG. 3 is a drawing schematically illustrating an intersection of the mesh structure of the apparatus for detecting rain using the wire mesh sensor in accordance with one example embodiment of the present disclosure.

By referring to FIG. 3, an insulating layer 111-3 is formed at each of the 1-st intersections C1 where each of the transmitters 111-1 and each of the receivers 111-2 cross. The insulating layer 111-3 blocks the transmission of the electricity between the transmitters 111-1 and the receivers 111-2 when it is not raining, but when the rain is positioned between the transmitters 111-1 and the receivers 111-2, the electricity is transmitted to the receiver 111-2 through the rain in spite of the insulating layer 111-3. Accordingly, at each of the 1-st intersections C1 where the rain is positioned, the electricity is conducted to the measuring part through each of the receivers 111-2 from each of the transmitters 111-1, thereby measuring the size of rain as well as the presence or the absence of the rain.

The present disclosure has an effect of providing an apparatus for detecting rain capable of accurately detecting rain by making the incident angles of the rain to be vertical regardless of the directions of the rain.

The present disclosure has another effect of recognizing the sizes and the positions of the precipitation passing through the measurement area of the wire mesh sensor.

The present disclosure has still another effect of providing the apparatus for detecting rain capable of accurately detecting the rain by installing a heating mesh parts with a similar topology to the wire mesh in order to remove the rain droplet that may be present at one or more intersections on the wire mesh.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. An apparatus for detecting rain using a wire mesh sensor, comprising:
   a wire mesh which is configured to include a plurality of transmitters and a plurality of receivers; and
   a fixing part for fixing the wire mesh;
   wherein the plurality of transmitters supply electricity to the wire mesh, and
   wherein, in response to rain being positioned between a specific transmitter among the plurality of transmitters and a specific receiver among the plurality of receivers, the specific receiver is configured to receive the electricity from the specific transmitter and then transmit the electricity to a measuring part, to thereby allow the measuring part to measure conductivity, wherein the plurality of transmitters in the wire mesh are respectively connected to a transmitter circuit, wherein the plurality of receivers in the wire mesh are respectively connected to a receiver circuit, and wherein one end of the measuring part is connected to the transmitter circuit and an opposite end of the measuring part is connected to the receiver circuit, wherein the wire mesh includes: a first mesh part comprised of the plurality of transmitters and the plurality of receivers; and a second mesh part comprised of a plurality of heaters, wherein the first mesh part is characterized in that the plurality of transmitters are arranged in a 1-st circumferential direction or in any direction within a 1-st circumferential threshold angle from the 1-st circumferential direction and that the plurality of receivers are arranged in a 2-nd circumferential direction or in any direction within a 2-nd circumferential threshold angle from the 2-nd circumferential direction, and wherein each of the plurality of transmitters and each of the plurality of receivers are arranged at a right angle to each other or at any angle within a 3-rd threshold angle from the right angle, wherein the second mesh part includes: 1-st second mesh parts arranged in the 1-st circumferential direction or in any direction within the 1-st circumferential threshold angle from the 1-st circumferential direction; and 2-nd second mesh parts arranged in the 2-nd circumferential direction or in any direction within the 2-nd circumferential threshold angle from the 2-nd circumferential direction, wherein the 1-st second mesh parts and the 2-nd second mesh parts are arranged at a right angle to each other or at any angle within the 3-rd threshold angle from the right angle, and wherein the wire mesh is characterized in that the wire mesh is in a form of a hemisphere, and in that a 1-st circumferential wire having a longest length on a surface of the hemisphere in the 1-st circumferential direction among the heaters in the 1-st second mesh parts and the plurality of transmitters is arranged in the 1-st circumferential direction, and other wires among the heaters in the 1-st second mesh parts and the plurality of transmitters are arranged in any direction within the 1-st circumferential threshold angle from the 1-st circumferential direction, and in that a 2-nd circumferential wire having a longest length on the surface of the hemisphere in the 2-nd circumferential direction among the heaters in the 2-nd second mesh parts and the plurality of receivers is arranged in the 2-nd circumferential direction, and other wires among the heaters in the 2-nd second mesh parts and the plurality of receivers are arranged in any direction within the 2-nd circumferential threshold angle from the 2-nd circumferential direction.

2. The apparatus of claim 1, wherein the wire mesh is characterized in that the plurality of transmitters and the heaters in the 1-st second mesh parts parallel thereto or arranged within the 1-st circumferential threshold angle are arranged alternately, and in that the plurality of receivers and the heaters in the 2-nd second mesh parts parallel thereto or arranged within the 2-nd circumferential threshold angle are arranged alternately.

3. The apparatus of claim 1, wherein each of the plurality of transmitters is separated by a predetermined distance, wherein the predetermined distance is determined by referring to a size of the rain, and wherein each of the plurality of receivers is separated by a preset distance by referring to the size of the rain.

4. An apparatus for detecting rain using a wire mesh sensor, comprising:

a wire mesh which is configured to include a plurality of transmitters and a plurality of receivers; and a fixing part for fixing the wire mesh;

wherein the plurality of transmitters supply electricity to the wire mesh, and wherein, in response to rain being positioned between a specific transmitter among the plurality of transmitters and a specific receiver among the plurality of receivers, the specific receiver is configured to receive the electricity from the specific transmitter and then transmit the electricity to a measuring part, to thereby allow the measuring part to measure conductivity, wherein the plurality of transmitters in the wire mesh are respectively connected to a transmitter circuit, wherein the plurality of receivers in the wire mesh are respectively connected to a receiver circuit, and wherein one end of the measuring part is connected to the transmitter circuit and an opposite end of the measuring part is connected to the receiver circuit, wherein the wire mesh includes: a first mesh part comprised of the plurality of transmitters and the plurality of receivers; and a second mesh part comprised of a plurality of heaters, wherein the first mesh part is characterized in that the plurality of transmitters are arranged in a 1-st circumferential direction or in any direction within a 1-st circumferential threshold angle from the 1-st circumferential direction and that the plurality of receivers are arranged in a 2-nd circumferential direction or in any direction within a 2-nd circumferential threshold angle from the 2-nd circumferential direction, and wherein each of the plurality of transmitters and each of the plurality of receivers are arranged at a right angle to each other or at any angle within a 3-rd threshold angle from the right angle, wherein the second mesh part includes: 1-st second mesh parts arranged in the 1-st circumferential direction or in any direction within the 1-st circumferential threshold angle from the 1-st circumferential direction; and 2-nd second mesh parts arranged in the 2-nd circumferential direction or in any direction within the 2-nd circumferential threshold angle from the 2-nd circumferential direction, wherein the 1-st second mesh parts and the 2-nd second mesh parts are arranged at a right angle to each other or at any angle within the 3-rd threshold angle from the right angle, and wherein the wire mesh is characterized in that an insulating layer is formed at each of 1-st intersections where each of the transmitters and each of the receivers cross, wherein no insulating layer is formed between each of the 1-st second mesh parts and each of the 2-nd second mesh parts at each of 2-nd intersections where each of the 1-st second mesh parts and each of the second mesh parts cross, and wherein no insulating layer is formed at each of 3-rd intersections where each of the plurality of transmitters and each of the 2 nd second mesh parts cross or where each of the plurality of receivers and each of the 1-st second mesh parts cross.

5. The apparatus of claim 4, wherein each of the 1-st second mesh parts and each of the 2-nd second mesh parts are processed with insulation coating.

* * * * *